United States Patent
Abe et al.

(10) Patent No.: US 6,357,693 B1
(45) Date of Patent: Mar. 19, 2002

(54) TAPE GUIDE ROLL WITH AN INNER CYLINDER RECESSED FROM AN OUTER CYLINDER AT THE ENDS

(75) Inventors: Masanori Abe, Miyagi; Kiyoshi Yoneyama, Yamanashi, both of (JP)

(73) Assignees: Sony Corporation, Tokyo; Citizen Electronics Co., Ltd., Yamanashi, both of (JP)

( * ) Notice: Subject to any disclaimer, the term of this patent is extended or adjusted under 35 U.S.C. 154(b) by 0 days.

(21) Appl. No.: 09/558,738

(22) Filed: Apr. 26, 2000

(30) Foreign Application Priority Data

Apr. 28, 1999 (JP) .......................... 11-121852

(51) Int. Cl.⁷ .......................... B65H 57/14; G03B 23/02
(52) U.S. Cl. .................. 242/615.2; 226/190; 242/346.2
(58) Field of Search .......................... 242/615.2, 346.2; 226/190, 196.1

(56) References Cited

U.S. PATENT DOCUMENTS

| | | | |
|---|---|---|---|
| 3,829,040 A | * | 8/1974 | Nelson ..................... 242/346.2 |
| 3,891,159 A | * | 6/1975 | Nelson ..................... 242/345.3 |
| 4,440,359 A | | 4/1984 | Nelson |
| 4,640,473 A | * | 2/1987 | Aoyama ................... 242/346.2 |
| 5,074,451 A | | 12/1991 | Tollefson et al. |
| D342,942 S | * | 1/1994 | Kotaki ....................... D14/483 |
| 5,454,501 A | | 10/1995 | Konno et al. |
| 5,934,538 A | * | 8/1999 | Hirose et al. ............... 226/194 |
| 6,027,778 A | * | 2/2000 | Alahapperuma et al. . 242/346.2 X |

FOREIGN PATENT DOCUMENTS

| | | |
|---|---|---|
| EP | 0188338 | 7/1986 |
| EP | 0789358 | 8/1997 |

* cited by examiner

*Primary Examiner*—Michael R. Mansen
(74) *Attorney, Agent, or Firm*—Jay H. Maioli (57) ABSTRACT

A roll for a tape guide 8 and a method for manufacturing the tape guide roll. The tape guide roll 8 is molded by injecting a molding material into a pre-set cavity 22. The tape guide roll 8 is made up unitarily of an inner cylindrical portion 9, an outer cylindrical portion 10, and plural connecting portions 11, 11, . . . unitarily interconnecting the inner cylindrical portion 9 and the outer cylindrical portion 10. The length of the inner cylindrical portion along the axial direction is longer than the tape width, and the length along the axial length of the outer cylindrical portion is longer than the length along the axial length of the inner cylindrical portion.

3 Claims, 11 Drawing Sheets

TAPE GUIDE ROLL WITH AN INNER CYLINDER RECESSED FROM AN OUTER CYLINDER AT THE ENDS

BACKGROUND OF THE INVENTION

1. Field of the Invention

This invention relates to a roll for a tape guide and a manufacturing method therefor. More particularly, it relates to a roll for a tape guide provided on a tape cassette for guiding it and a manufacturing method therefor.

2. Description of Related Art

A tape cassette or an apparatus for recording or reproducing information signals on or from the tape cassette is provided with a tape guide roll for guiding the tape.

Figure 1:
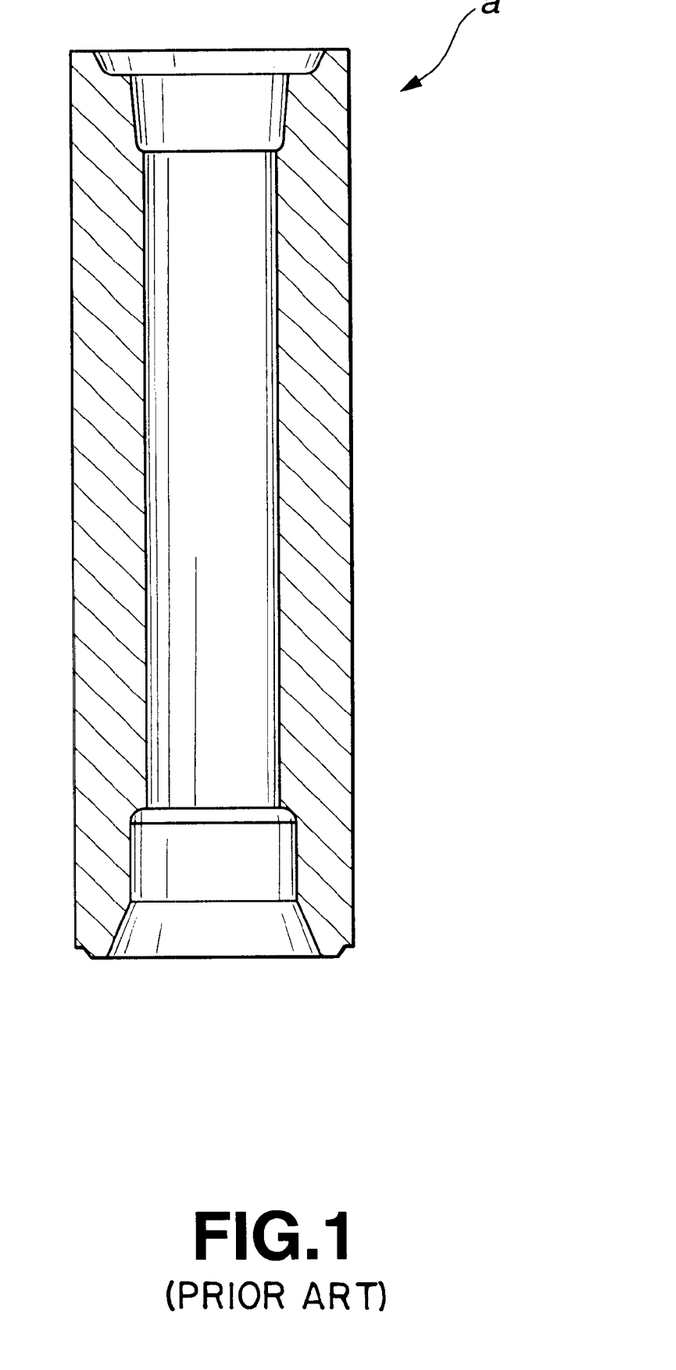
Figure 2:
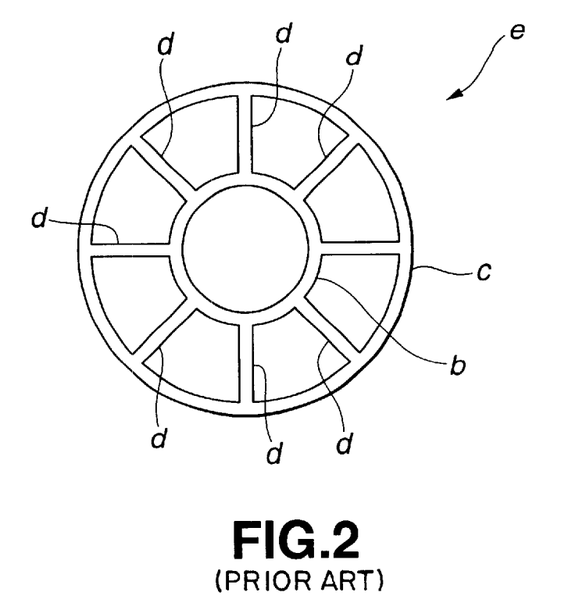
FIG. 2 is an enlarged plan view showing another conventional tape guide roll.
Figure 3:
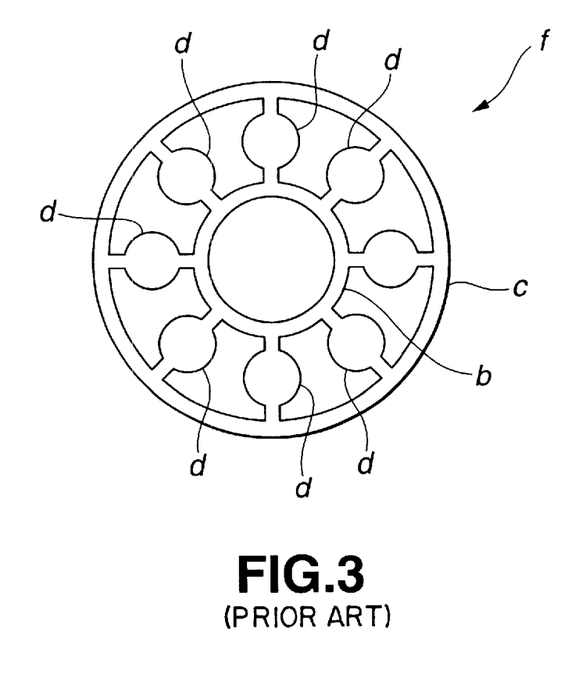
FIG. 3 is an enlarged plan view showing another conventional tape guide roll.

As this tape guide roll, there are known a substantially cylindrically-shaped tape guide roll a, manufactured by injection molding from a molten resin (see FIG. 1), and tape guide rolls e,f formed as-one from an inner cylinder b, an outer cylinder c and a plurality of connecting portions d interconnecting the inner cylinder b and the outer cylinder c with a radial spacing in-between (see FIGS. 2 and 3).

If, in general, the tape guide roll is to be formed unitarily by injection molding, the molten resin charged into the cavity is cooled and solidified to produce a sink. If this sink is excessive, the outer peripheral surface cannot be formed as concentric cylindrical surface and hence certain precision of the molded product (tape guide roll) cannot be maintained, thus occasionally affecting tape characteristics to produce hindrance in tape running.

Thus, in the aforementioned tape guide rolls a, e or f, an injection-molded product has its outer periphery machined to improve the precision in shape in order to form the outer peripheral surface as an optimum concentric cylindrical surface.

However, if the machining is used to improve the precision in profile, there is raised a problem that machining is labor-consuming to raise the production cost. Moreover, machining precision is also a requirement.

On the other hand, if the tape guide roll is to be manufactured by injection molding, the injection pressure in the cavity differs appreciably depending on the position of a gate provided in a molding device for injection molding. Moreover, unneeded load is applied to the molded product at the time of ejection, depending on the ejecting position by an ejection pin, thus occasionally worsening the precision in shape of the molded product.

SUMMARY OF THE INVENTION

It is therefore an object of the present invention to provide a tape guide roll and a manufacturing method therefor, in which it is possible to maintain an optimum tape running state.

In one aspect, the present invention provides a tape guide roll produced by injecting a molding material into a pre-set cavity and formed unitarily from an inner cylindrical portion, an outer cylindrical portion coaxial as the inner cylindrical portion, and a plurality of connecting portions arranged in a spaced apart relationship from one another along the circumferential direction for interconnecting the inner and outer cylindrical portions, wherein the length in the axial direction of the inner cylindrical portion is set so as to be longer than a tape width, with the length in the axial direction of the outer cylindrical portion being longer than the length in the axial direction of the inner cylindrical portion.

Thus, optimum tape running is assured even in a tape guide roll which is produced without machining.

In a preferred embodiment of the present invention, the length in the axial direction of the inner cylindrical portion and the connection portion is not smaller than 90% of the length in the axial direction of the outer cylindrical portion. By so doing, there is scarcely any difference in the force of contraction in the respective portions along the axial direction of the tape guide roll to eliminate inconveniences such as gate breakage, whilst the outer periphery of the outer cylindrical portion can be formed as a concentric cylindrical surface of a high accuracy.

In another present embodiment of the present invention, the thickness of the inner cylindrical portion and the thickness of the outer cylindrical portion are set so as to be not larger than 0.5 mm and the thickness in the circumferential direction at least of both end portions of the connecting portions connecting to the inner and outer cylindrical portions is set so as to be not larger than 0.5 mm. As a result, the tape guide roll can be provided in which the force of contraction during cooling and solidification of the molten resin is suppressed and the sink is minimized to assure optimum accuracy in the respective portions.

In another aspect, the present invention provides a manufacturing method for a tape guide roll in which a molding material is injected into a pre-set cavity to unitarily form an inner cylindrical portion, an outer cylindrical portion coaxial with the inner cylindrical portion, and a plurality of connecting portions arranged in a spaced apart relationship from one another along the circumferential direction for interconnecting the inner and outer cylindrical portions, wherein the method includes a step of injecting the molding material into the cavity from a gate arranged at a position facing an end face of a portion which is to form the connecting portion, thrusting the opposite end face to the one end face of the connecting portion by an ejecting pin and simultaneously thrusting the outer cylindrical portion to project the tape guide roll a pre-set amount and ejecting the tape guide roll by a stripper plate after projecting the tape guide roll the pre-set amount.

In this manufacturing method, the injection pressure in the cavity is improved in uniformity, such that the molten resin is injected substantially uniformly into respective parts of the cavity, at the same time the mold release resistance at the time of ejection is diminished to maintain optimum molding accuracy of the tape guide roll.

Since the ejection is initially by the ejection pin and by the stripper plate, and subsequently by solely the stripper plate, there is left no mark of ejection by the ejection pin. In addition, no unneeded load tends to be partially applied to the molded product during its ejection.

BRIEF DESCRIPTION OF THE DRAWINGS

FIGS. 1 to 3 show a conventional tape guide roll, with FIG. 1 being an enlarged longitudinal cross-sectional view thereof.

FIGS. 4 to 12 show an embodiment of a tape guide roll according to the present invention and an embodiment of the manufacturing method for the tape guide roll, with FIG. 4 being a schematic exploded perspective view showing a tape cassette provided with a tape guide roll.

FIGS. 9 to 12 show respective steps of a manufacturing method of the tape guide roll, with FIG. 9 being an enlarged longitudinal cross-sectional view showing the state prior to injection of the molten resin into a cavity.

DESCRIPTION OF THE PREFERRED EMBODIMENTS

Referring to the drawings, preferred embodiments of the present application will be explained in detail.

In the following embodiment, the present invention is applied to a tape guide roll used for a tape cassette and a manufacturing method therefor.

First, schematics of a tape cassette are explained.

Figure 4:
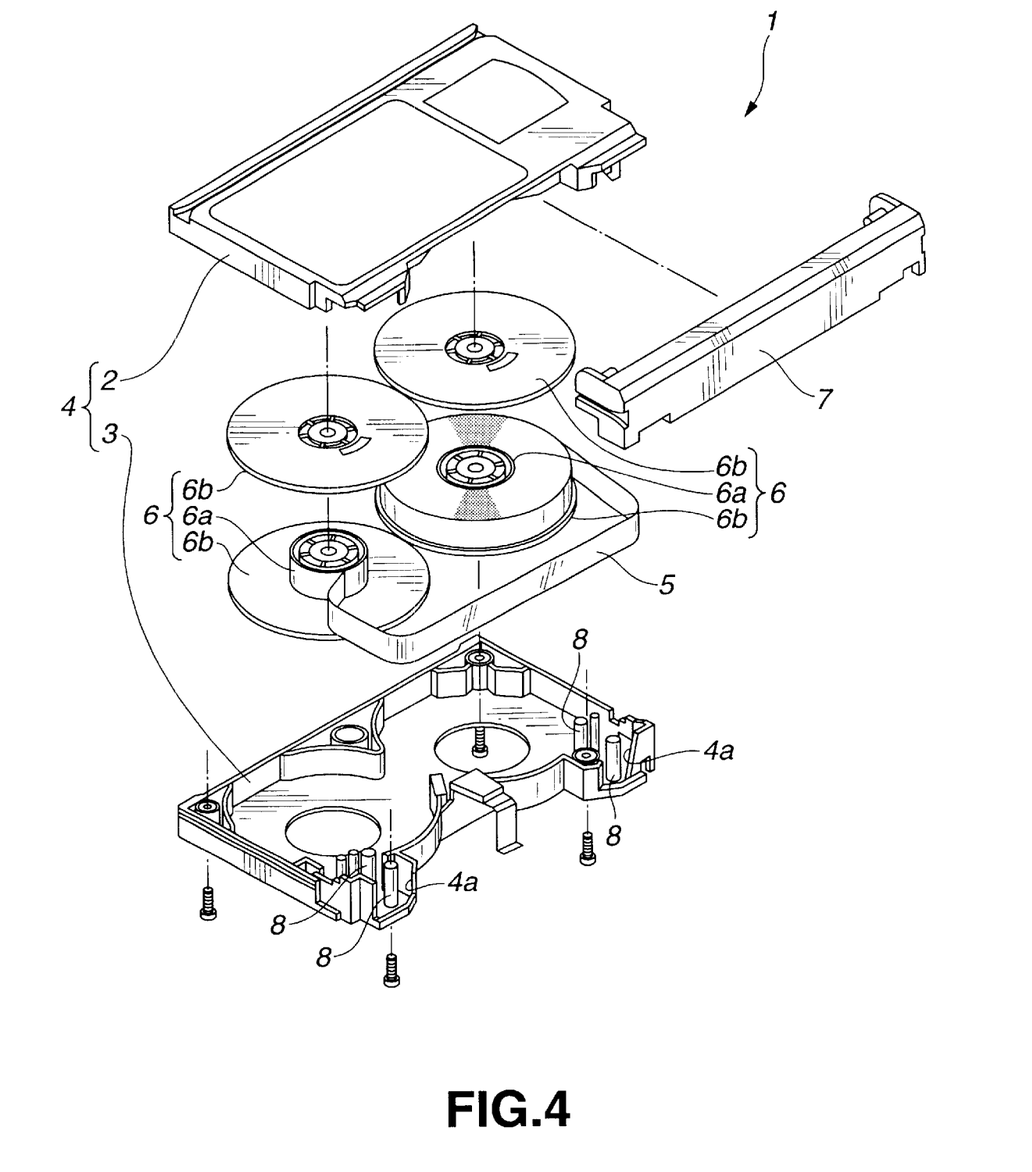

A tape cassette 1 includes a cassette casing 4, obtained on interconnecting an upper cartridge half 2 and lower cartridge half 3, a pair of tape reels 6, 6, carrying a tape 5, wound thereon, and a lid 7 rotationally supported on one end of the cassette casing 4, with the tape reels 6, 6 being rotatably housed in the cassette casing 4, as shown in FIG. 4.

The tape reel 6 includes a hub 6a, about which the tape 5 is wound, and flanges 6b, 6b, provided on both axial ends of the hub 6a.

At pre-set positions in the cassette casing 4 are rotatably supported tape guide rolls 8, 8, . . . ,for guiding the tape 5.

When the tape cassette 1 is loaded on a loading unit of an apparatus for recording and/or reproducing on the tape 5, the lid 7 is opened by a lid opening unit and the tape 5 is pulled out from tape pull-out openings 4a, 4a of the cassette casing 4 by the tape pull-out unit to complete a pre-set tape path. The tape 5, thus pulled out, is caused to run by a tape running mechanism of the recording and/or reproducing apparatus, as it is guided by the tape guide roll 8, 8, . . . and a tape guide roll rotatably supported by the recording and/or reproducing apparatus.

Figure 5:
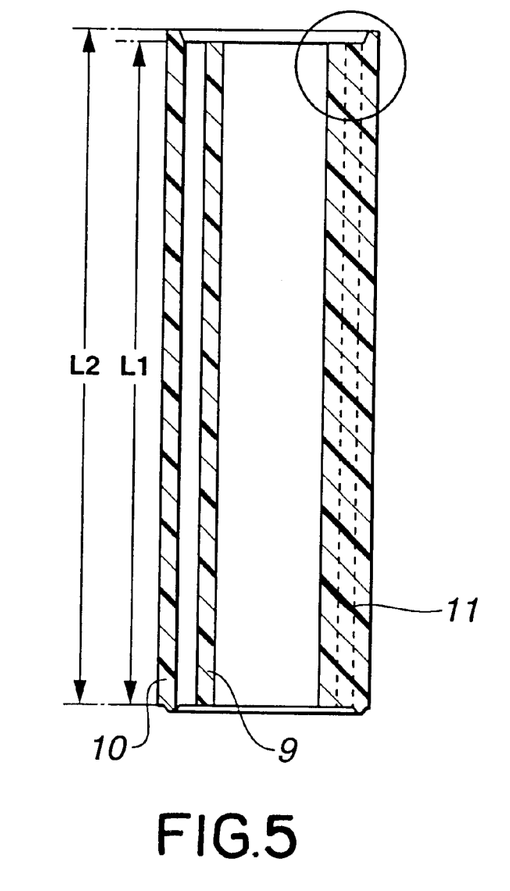
FIG. 5 is an enlarged longitudinal cross-sectional view of the tape guide roll.
Figure 5A:
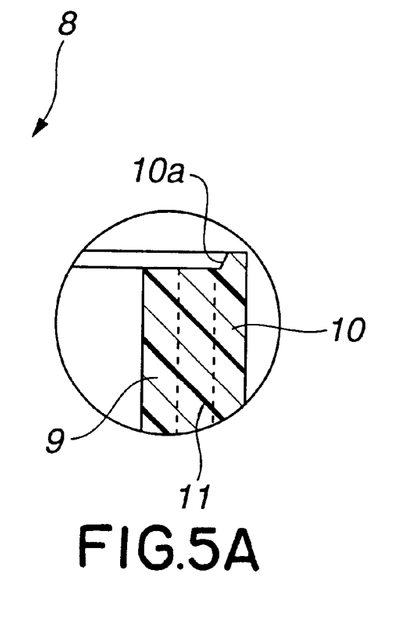
FIG. 5A is an enlarged cross-sectional view of the tape guide roll.

Next, the tape guide roll 8 is explained with reference to FIG. 5 and FIG. 6.

The tape guide roll 8 is formed unitarily from an inner cylindrical portion 9, an outer cylindrical portion 10 and connecting portions 11, 11, . . . by e.g., injection molding. No machining operations are executed after the injection molding for forming the tape guide roll 8.

The molding material for the tape guide roll 8 is POM (polyoxymethylene), such as that manufactured by ASAHI KASEI KOGYO CO,. LTD. under the trade name of TENAC C8520j, having a melt flow not less than 45 g/min, as measured by ASTM D1238. Meanwhile, the POM used is a so-called natural resin not containing additives, e.g., coloring agents, such as dyestuffs or mold release agents.

By employing POM having the melt flow rate not lower than 45 g/min as a material for the tape guide roll 8, it is possible to assure optimum flow characteristics of the material for injection molding to form the tape guide roll 8 having high molding accuracy. By employing the natural resin, optimum molding properties are realized, whilst so-called bleeding, that is the additives exuding to an outer surface, is not produced, thus evading running troubles of the tape 5 ascribable to bleed-out. Both the inner cylindrical portion 9 and the outer cylindrical portion 10 are cylindrically-shaped, with the outer surface of the inner cylindrical portion 9 being connected by connecting portions 11, 11, . . . , to the inner surface of the outer cylindrical portion 10. The connecting portions 11, 11, . . . are of the same length as the length L1 along the axis of the inner cylindrical portion 9, as shown in FIG. 5, and are extended in the radial direction, with the center axis of the inner cylindrical portion 9 as reference, while being equiangularly spaced apart along the circumferential direction.

Figure 6:
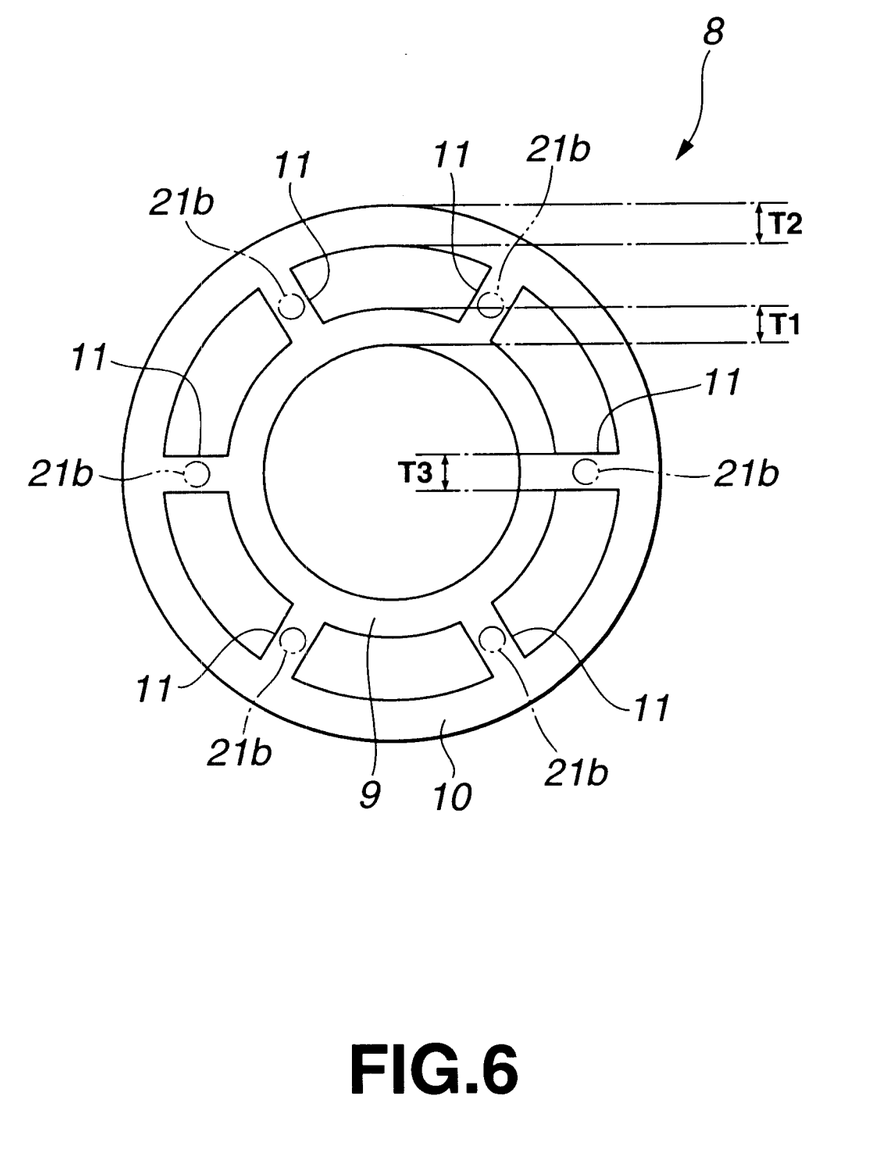
FIG. 6 is an enlarged plan view of the tape guide roll.

The thickness T1 of the inner cylindrical portion 9, the thickness T2 of the outer cylindrical portion 10 and the thickness T3 along the circumferential direction of the connecting portions 11, 11,. . . are not larger than 0.5 mm (see FIG. 6).

If the thicknesses T1 to T3 are set to not larger than 0.5 mm, it is possible to suppress the force of contraction at the time of cooling and solidification of the molten resin to minimize the generation of sink to provide the tape guide roll 8 respective parts of which are of optimum precision. In general, the thicknesses T1 to T3 are preferably not less than 0.2 mm in consideration of tenacity of the respective parts of the tape guide roll 8.

In the foregoing, the connecting portions 11, 11, . . . in their entirety are of a thickness not larger than 0.5 mm. It is however possible that only the thickness along the circumferential direction of both ends of the connecting portions 11, 11, . . . connecting to the inner and outer cylindrical portions 9, 10 be set to 0.5 mm or less.

A step 10a is formed at one end of the outer cylindrical portion 10 towards the connecting portions 11, 11, . . . , so that the length L2 along the axial direction of the outer cylindrical portion 10 is selected to be slightly larger than the length L1 of the inner cylindrical portion 9 and the connecting portion 11.

For example, if the tape 5 used is of a width of 8 mm, the tape guide roll 8 is designed e.g., with L1=16.8 mm and L2=17.2 mm. Thus, the length along the axis of the inner cylindrical portion 9 is 97.7% of the length along the axis of the outer cylindrical portion 10. The length L1 along the axis of the inner cylindrical portion 9 is selected to be longer than the tape width.

By setting the length along the axis of the inner cylindrical portion 9 so as to be longer than the width of the tape 5, the tape 5 is guided positively by the tape guide roll 8 to assure the optimum running state of the tape 5, even though the tape 5 is not machined after injection molding and is run with oscillations along the width of the tape guide roll 8.

Meanwhile, if the tape guide roll is produced by injection molding, it may be an occurrence that the molten resin be left in a minor quantity on a portion of the tape guide roll facing the distal end of a gate, such as an end face of the inner cylindrical portion 9 or the connecting portion (gate breakage), as a result of which unneeded projecting portions tend to be formed on the tape guide roll 8. With this in mind, a step difference is routinely formed at the remaining portions, that is on the outer cylindrical portion, so that the unneeded projecting portions will not protrude from the remaining portions.

However, if the length along the axis of the outer cylindrical portion is selected to be longer than that of the inner cylindrical portion or the connecting portion, variations tend to be produced in the force of contraction of various portions of the resin along the axial direction of the outer cylindrical portion. If this variation is larger, there is produced larger sink, as a result of which it becomes difficult to form the outer periphery of the outer cylindrical portion to high accuracy as a concentric cylindrical surface.

In the tape guide roll 8, the step difference 10a is provided to eliminate the inconvenience of gate breakage, as explained above. However, since the axial length of the inner cylindrical portion 9 is only slightly smaller than the axial length of the outer cylindrical portion, specifically, it is 97.7% of the axial length of the outer cylindrical portion, difference in the force of contraction of the resin in various axial portions is scarcely produced, such that the inconvenience due to the gate breakage can be overcome to enable the outer periphery of the outer cylindrical portion 10 to be produced to high accuracy as a concentric cylindrical surface.

In the foregoing, L1/L2=0.977 for the tape guide roll 8. However, out experimentation has revealed that, if L1/L2≧0.9, the tape guide roll can be formed with satisfactory precision of the outer periphery of the outer cylindrical surface which does not obstruct the running of the tape 5.

Therefore, with the tape guide roll 8, it is unnecessary that the ratio of the axial length of the inner cylindrical portion 9 to that of the outer cylindrical portion 10 be set to 97.7%, it being only necessary that the ratio L1/L2 be not less than 90%.

With the above-described tape guide roll 8, the step difference 10a is provided only on one axial end of the outer cylindrical portion 10. Alternatively, such step difference may also be provided on both axial ends of the outer cylindrical portion 10.

A manufacturing apparatus 12 for manufacturing the tape guide roll 8 and the manufacturing method of the tape guide roll 8 by this manufacturing apparatus 12 are hereinafter explained by referring to FIG. 7 to FIG. 12.

Figure 7:
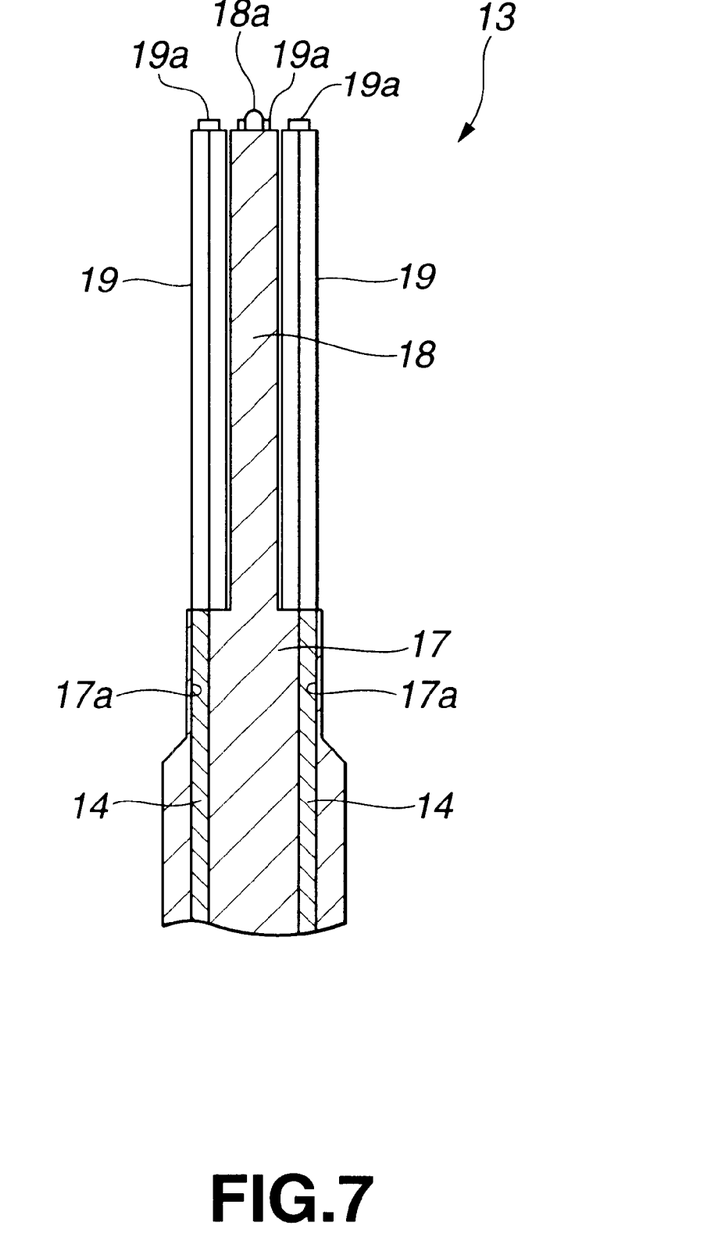
FIG. 7 is an enlarged longitudinal cross-sectional view showing a portion of a movable core pin of a manufacturing device.
Figure 8:
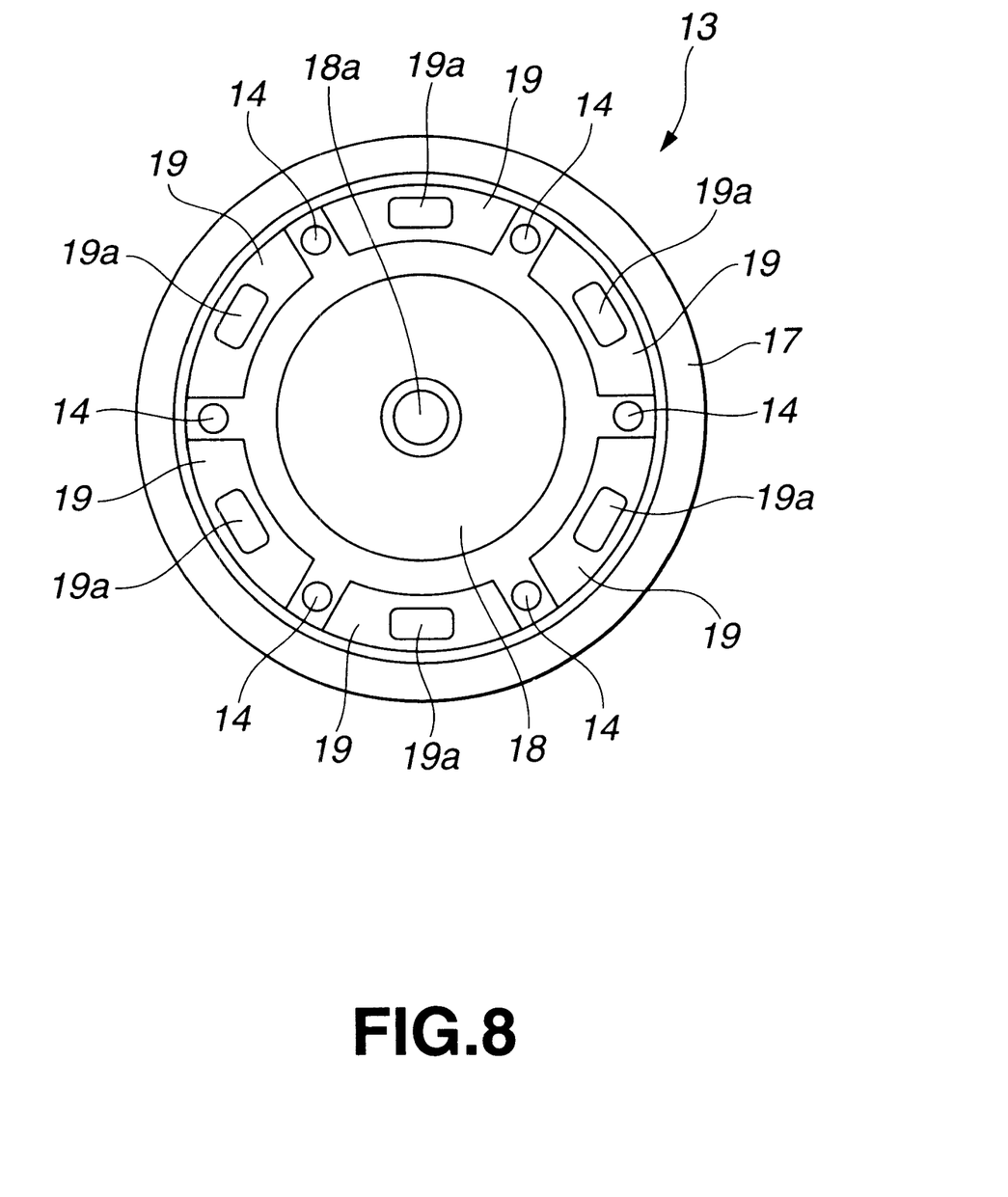
FIG. 8 is an enlarged plan view of a movable core pin.
Figure 9:
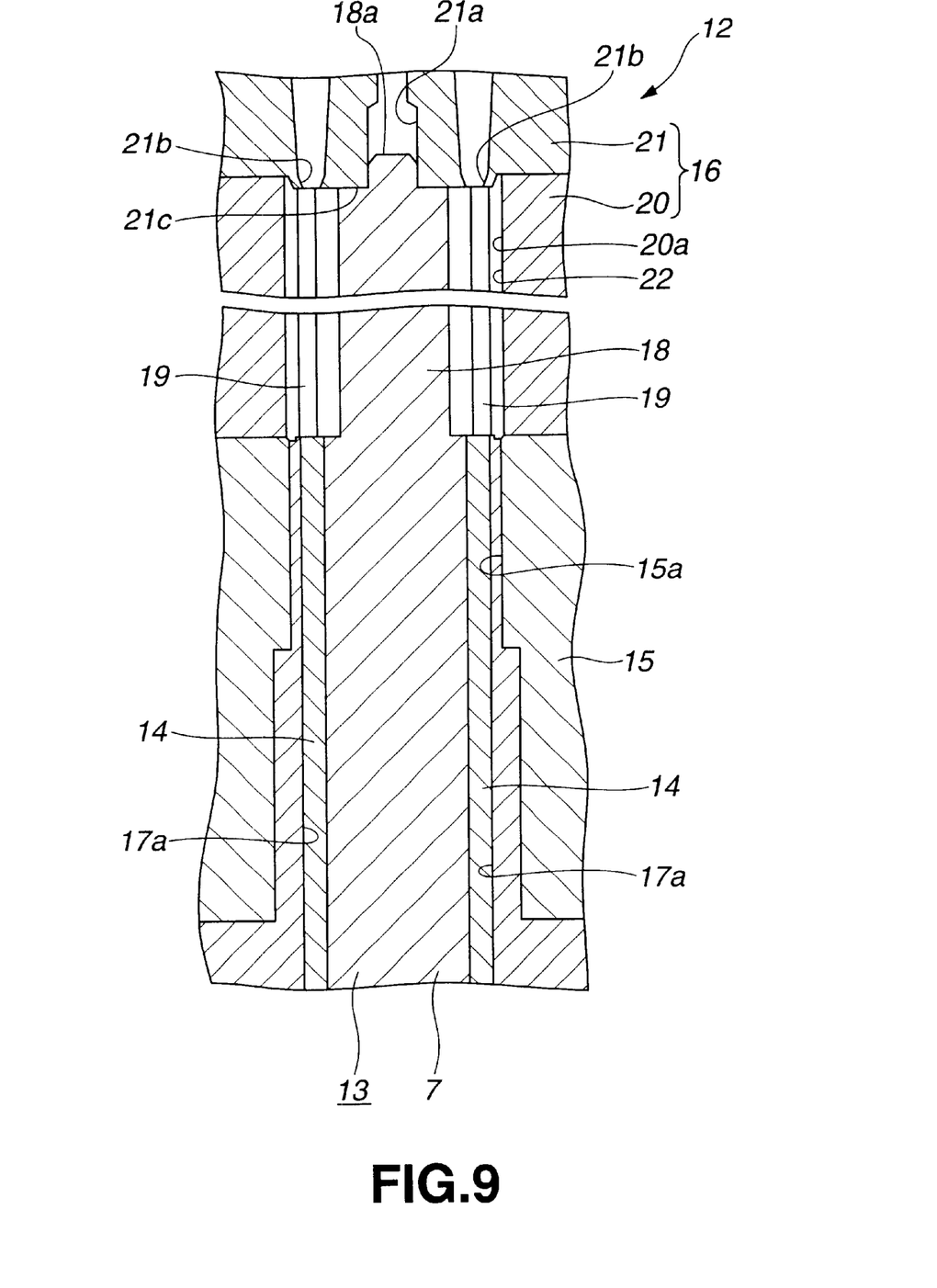

The tape guide roll 8 is produced by injection molding by the manufacturing apparatus 12, which is made up of a movable core pin 13, extruder pins 14, 14, ..., a stripper plate 15 and a center plate 16, as shown in FIG. 7 to FIG. 9.

The movable core pin 13 is made up of a substantially columnar-shaped proximal portion 17, a first core portion 18 and six core portions 19, 19, ... extending in the same direction from an end face of the proximal portion 17, as shown in FIG. 7 and FIG. 8.

The first core portion 18 is a round bar protruded from the center of an end face of the proximal portion 17. The mid portion of the end face of the first core portion 18 is formed with a positioning lug 18a.

The second core portions 19, 19, ... are arcuately-shaped and protrude from the rim of an end face of the proximal portion 17 at an equal circumferential spacing from the rim of the end face of the proximal portion 17. The distal end faces of the second core portions 19, 19, ... are formed with positioning lugs 19a, 19a.

The proximal portion 17 has six support holes 17a, 17a, opening in the rim of the end face thereof, these support holes 17a, 17a, being formed between neighboring second core portions 19, 19, ..., Within the support holes 17a, 17a, ... are slidably disposed extruder pins 14, 14, ....

The stripper plate 15 is provided with an arranging hole 15a within which is arranged the proximal portion 17 of the movable core pin 13, as shown in FIG. 9. The stripper plate 15 is movable relative to the proximal portion 17 along the axis thereof.

The center plate 16 is made up of a first plate 20, positioned towards the stripper plate 15, and a second plate 21, unified as-one to the first plate 20 and which is located on the opposite side of the stripper plate 15 with the first plate 20 in-between, as shown in FIG. 9. The center plate 16 is movable in a direction into contact with and away from the stripper plate 15.

The first plate 20 is formed with a resin charging portion or hole 20a. The first plate 20 is also formed with a positioning hole 21a. The outer rim portion of the second plate 21 is formed with six gates 21b, 21b, ... at an equiangular distance along its circumference, whilst the second plate 21 is formed with positioning holes, not shown, lying between the gates 21b, 21b, ....

The second plate 21 is formed with a projection 21c slightly protruded towards the stripper plate 15, with the outer diameter of the projection 21c being slightly smaller than the inner diameter of the resin charging portion 20a of the first plate 20. Thus, by this projection 21c and an end of the first plate 20, a ring-shaped space is defined within the resin charging portion 20a for forming the step difference 10a for the tape guide roll 8.

The manufacturing method for the tape guide roll 8 is hereinafter explained by referring to FIGS. 9 to 12.

Before charging the molten resin (POM) in the resin charging portion 20a of the center plate 16, the first plate 20 of the center plate 16 is combined with the stripper plate 15. The proximal portion 17 is arranged in the arranging hole 15a of the stripper plate 15, whilst the proximal portion 17 is disposed so that its end face will be flush with an end face of the stripper plate 15, as shown in FIG. 9. The ejecting pins 14, 14, ... are carried by the supporting holes 17a, 17a, ... so that the end faces of the ejecting pins 14, 14, ... are flush with the end face of the proximal portion 17 of the movable core pin 13.

In the resin charging portion 20a of the first plate 20 are intruded the first core portion 18 and the second core portions 19, 19, ... of the movable core pin 13. On the other hand, the first positioning pin 18a of the first core portion 18 is intruded and positioned in the positioning hole 21a, while the positioning holes 19a, 19a, ... of the second core portions 19, 19, ... are intruded and positioned in positioning holes, not shown, of the second plate 21, as shown in FIG. 9.

By arranging respective members of the manufacturing apparatus 12 in this manner, there is formed in the resin charging portion 20a a cavity 22 surrounded by the respective facets of the movable core pin 13, extruder pins 14, stripper plate 15 and the center plate 16, as shown in FIG. 9.

Figure 10:
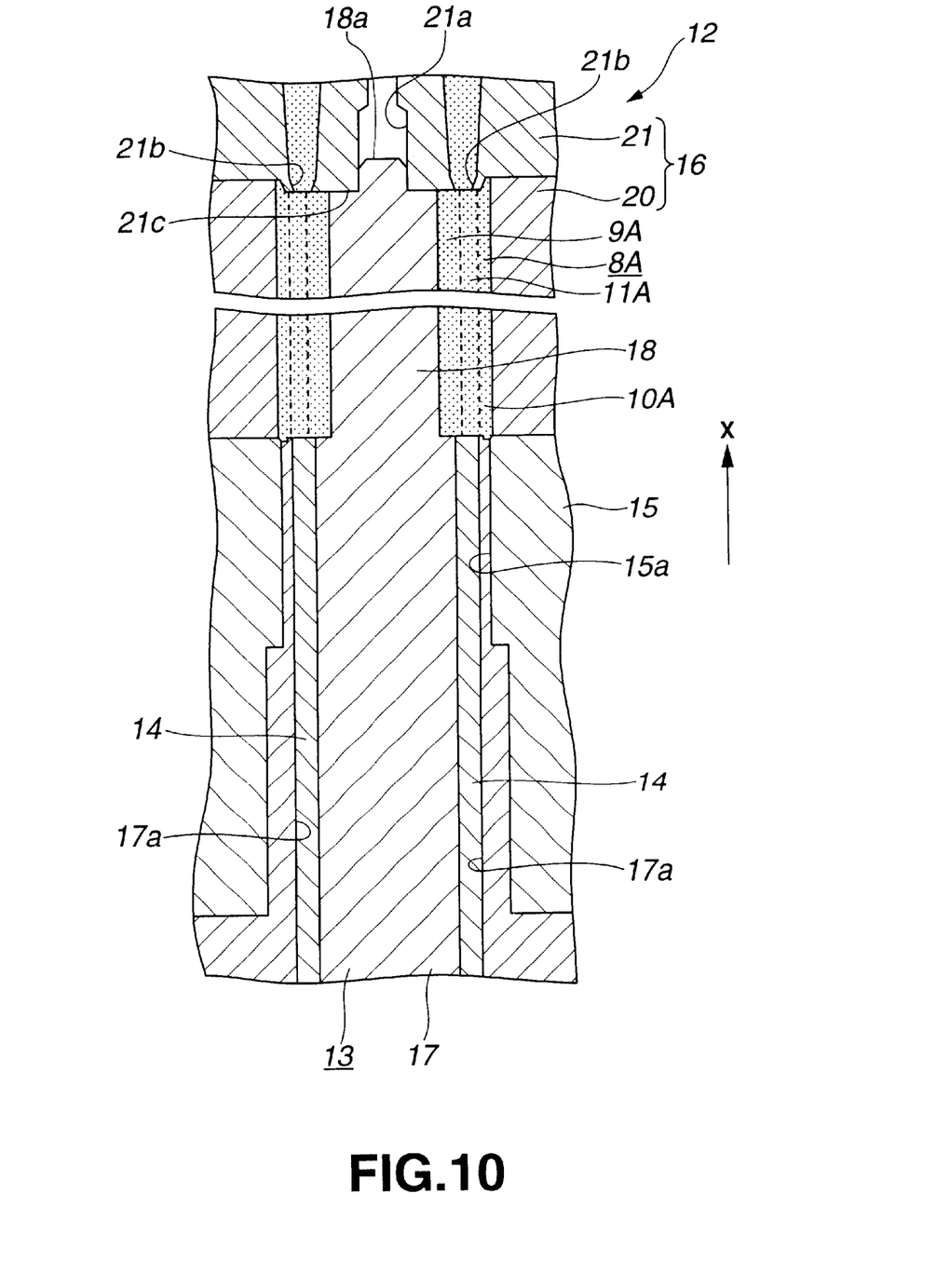
FIG. 10 is an enlarged longitudinal cross-sectional view showing the state in which the molten resin is charged into the cavity to produce an intermediate body.

The molten resin is poured into the cavity 22 through a runner from the gates 21b, 21b, ..., When the poured molten resin has been charged into the cavity 22, an intermediate member 8A is formed as an intermediate product, as shown in FIG. 10. On the other hand, when the molten resin has been charged into the cavity 22, injection of the molten resin from the gates 21b, 21b, . . . into the cavity 22 is halted.

The intermediate member 8A is made up of an inner cylinder forming portion 9A, adapted to form the inner cylindrical portion 9, an outer cylinder forming portion 10A, the outer cylindrical portion 10, and connecting portion forming portions 11A, 11A, . . . , adapted to form the portions forming the connecting portions 11, 11, . . . , with the gates 21b, 21b, . . . being positioned facing end faces of the connecting portion forming portions 11A, 11A, as shown in FIG. 6 and FIG. 10. The opposite end faces of the connecting portion forming portions 11A, 11A are contacted with the end faces of the ejecting pins 14, 14, . . . , as shown in FIG. 10. Thus, the gates 21b, 21b, . . . and the ejecting pins 14, 14, . . . are positioned on both sides of the connecting portion forming portions 11A, 11A.

Meanwhile, by the gates 21b, 21b, . . . being positioned facing the end faces of the connecting portion forming portions 11A, 11A, the gates 21b, 21b, . . . are positioned intermediately between the inner cylinder forming portion 9A and the outer cylinder forming portion 10A, so that it becomes possible to inject the molten resin substantially uniformly into respective portions of the cavity 22 to produce a molded product to higher precision.

The intermediate member 8A is cooled and solidified to form the tape guide roll 8 in the cavity 22. After completion of the cooling and solidification of the intermediate member 8A, the center plate 16 is moved in the direction indicated by arrow X in FIG. 10, away from the stripper plate 15. When the center plate 16 is moved in the direction indicated by arrow X, the tape guide roll 8 is left on the side of the stripper plate 15, as the tape guide roll 8 embraces the movable core pin 13.

Figure 11:
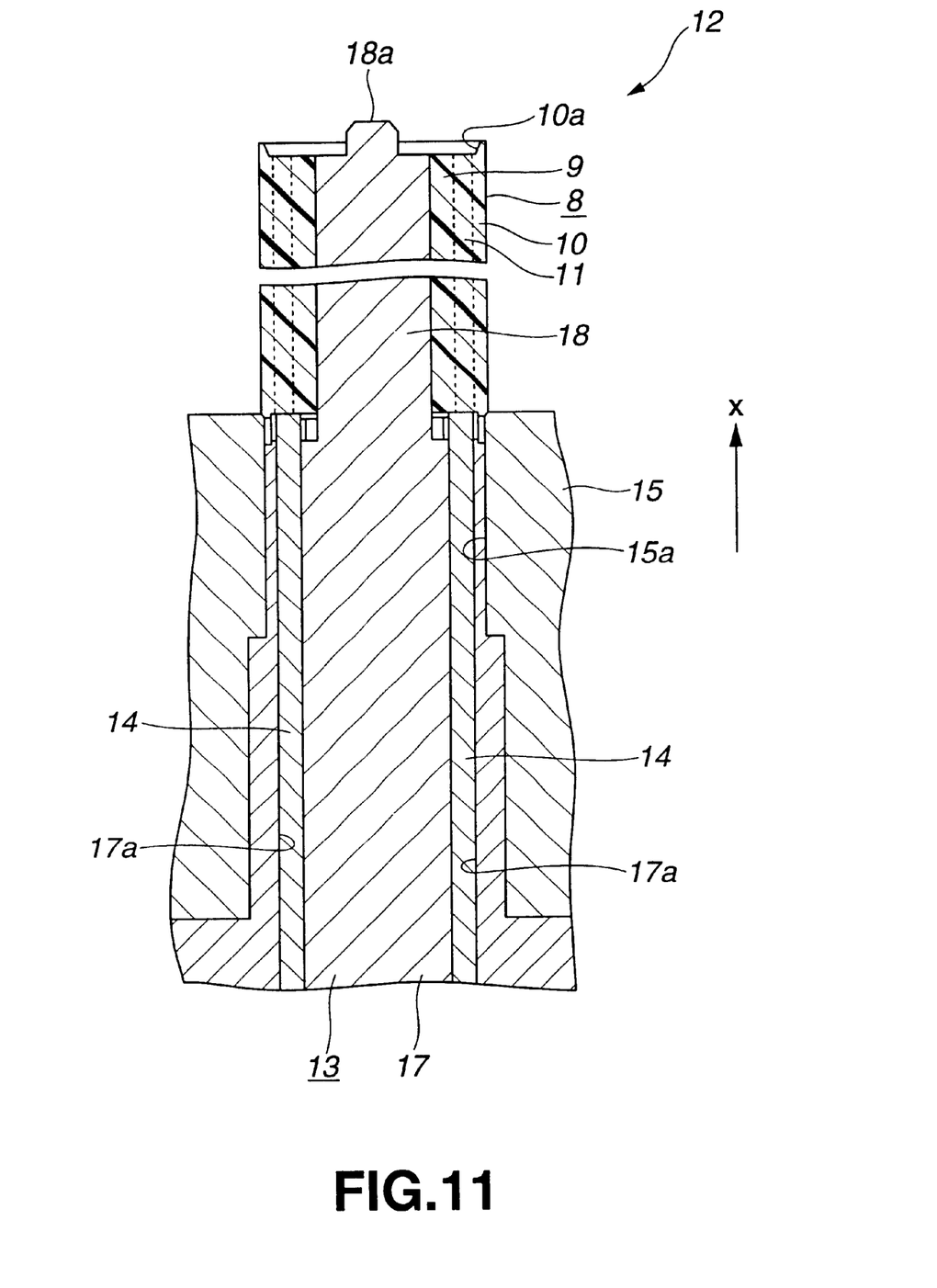
FIG. 11 is an enlarged longitudinal cross-sectional view showing the state in which tape guide roll formed on cooling and solidification is being ejected by an extruder pin and a stripper plate.

The ejecting pins 14, 14, . . . and the stripper plate 15 are moved at the same speed a pre-set amount in the X direction with respect to the movable core pin 13, until the tape guide roll 8 is protruded in an amount corresponding to the pre-set amount of movement, as shown in FIG. 11. At this time, the tape guide roll 8 is ejected by the outer cylindrical portion 10 being thrust by the stripper plate 15 and by the opposite side end faces of the connecting portions 11, 11, . . . being thrust by the stripper plate 15.

If the connecting portions 11, 11, . . . are thrust by the ejecting pins 14, 14, . . . in this manner, it is mid portions of the inner cylindrical portion 9 and the outer cylindrical portion 10 that are thrust, so that the mold release resistance is small, whilst no unneeded load tends to be applied to the tape guide roll 8 as a result of the ejection, thus assuring optimum molding precision of the tape guide roll 8.

Moreover, since the ejection by the stripper plate 15 occurs simultaneously as the thrusting by the ejecting pins 14, 14, . . . , no unneeded load tends to be applied to the tape guide roll 8 during ejection, thus further improving the molding precision of the tape guide roll 8.

Figure 12:
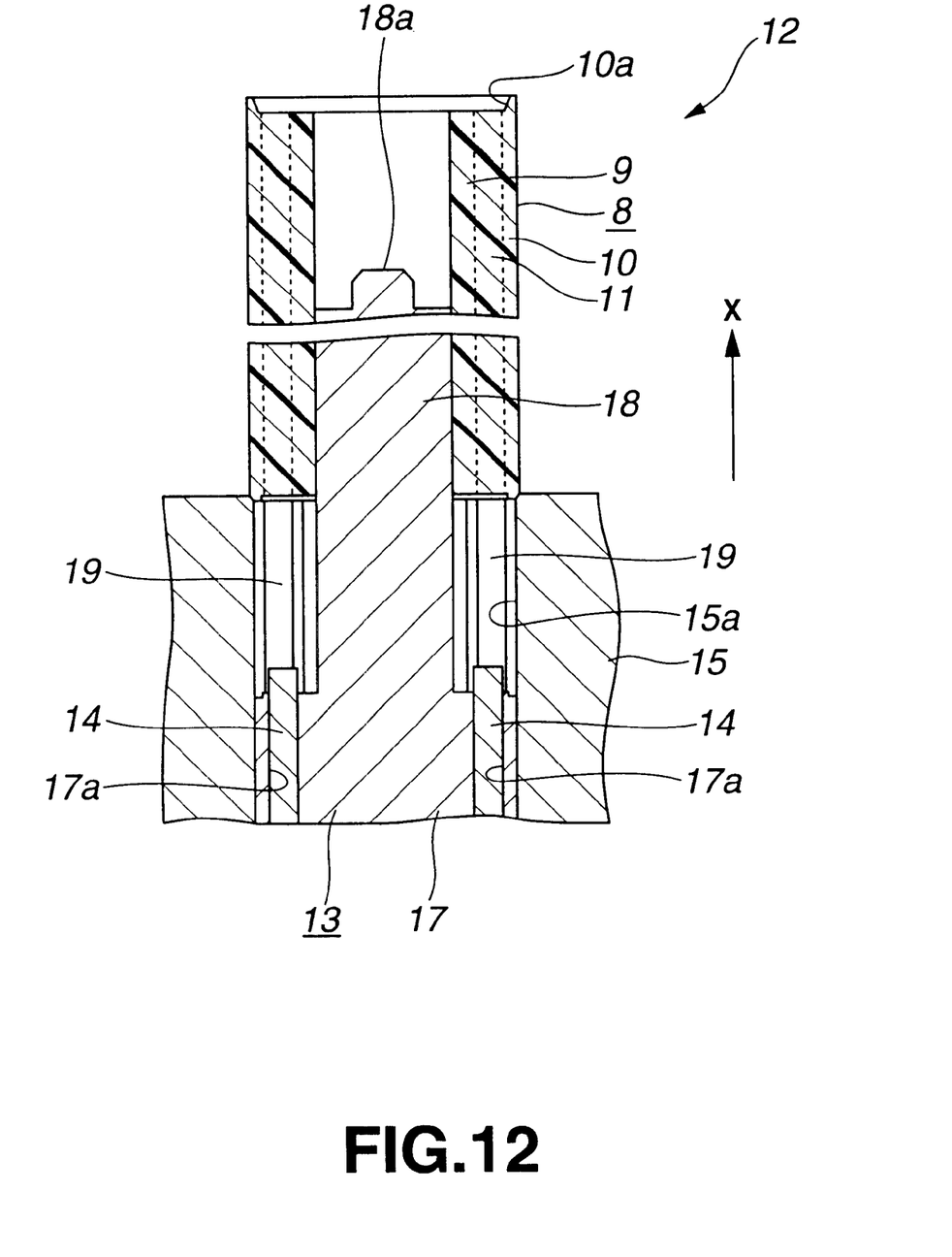
FIG. 12 is an enlarged longitudinal cross-sectional view showing the state in which tape guide roll formed on cooling and solidification is being ejected solely by a stripper plate.

When the ejecting pins 14, 14, . . . and the stripper plate 15 have been moved a pre-set amount to complete the first stage ejection, movement of the ejecting pins 14, 14, . . . is halted. However, the stripper plate 15 continues to be moved in the direction indicated by arrow X to execute the second stage ejection. This second stage ejection is executed by the outer cylindrical portion 10 of the tape guide roll 8 being thrust by the stripper plate 15, as shown in FIG. 12.

When the tape guide roll 8 is ejected by the stripper plate 15, and the tape guide roll 8 is detached from the first core portion 18 and the second core portions 19, 19, . . . of the movable core pin 13, movement of the stripper plate 15 is halted to complete the ejection of the tape guide roll 8.

Since the first stage ejection of the tape guide roll 8 is effected by the ejecting pins 14, 14, . . . and the stripper plate 15, at the same time as the second stage ejection of the tape guide roll 8 is effected by solely the stripper plate 15, ejection marks otherwise produced due to ejection by the ejecting pins 14, 14, . . . are not left in the molded article, whilst no unneeded load due to partial extrusion tends to be applied.

In the above-described arrangement, it has been confirmed, as a result of our manufacturing tests, that the tape guide roll 8, having superior molding precision, with the amount of sink, that is the difference between the maximum outer diameter and the smallest outer diameter of the outer cylindrical portion 10, being not larger than 25 $\mu$m, and with the surface roughness Rz being not larger than 1.5$\mu$m, can be produced by monochromatic injection molding, which allows for facilitated molding, despite the fact that a crystalline material having a contraction ratio larger than the amorphous material (POM) is used.

Meanwhile, if an amorphous material is used, a molded article, herein a tape guide roll, can in general be produced to a high molding precision. However, the tape guide roll produced from the amorphous material is far inferior in abrasion resistance to the tape guide roll formed of the crystalline material and suffers from a high rate of noise occurrence.

Thus, with the use of the tape guide roll 8 with high molding precision, prepared from the crystalline material, it is possible to assure an optimum running state of the tape 5 with high probability.

The shape or the structure of respective parts shown in the above-described embodiment represents only an illustrative example of execution of the present invention and should not be construed as limiting the technical scope of the invention.

What is claimed is:

1. A tape guide roll produced by injecting a molding material into a pre-set cavity and formed unitarily from an inner cylindrical portion, an outer cylindrical portion coaxial with said inner cylindrical portion, and a plurality of connecting portions arranged in a spaced apart relationship along a circumferential direction for interconnecting said inner and outer cylindrical portions, wherein a length in an axial direction of said inner cylindrical portion is set to be longer than a tape width, with a length in the axial direction of said outer cylindrical portion being longer than the length in the axial direction of said inner cylindrical portion, so that an upper end of said inner cylindrical portion is recessed from an upper end of said outer cylindrical portion and a lower end of said inner cylindrical portion is recessed from a lower end of said outer cylindrical portion.

2. The tape guide according to claim 1, wherein a ratio of the length in the axial direction of said inner cylindrical portion and each of the plurality of connecting portions to the length in the axial direction of said outer cylindrical portion is at least 0.9.

3. The tape guide roll according to claim 1, wherein a thickness of said inner cylindrical portion and a thickness of the outer cylindrical portion are between 0.2 mm and 0.5 mm, and wherein a thickness in the circumferential direction of at least both end portions of each of said plurality of connecting portions connecting said inner and outer cylindrical portions is between 0.2 mm and 0.5 mm.

* * * * *